Sept. 15, 1964   J. J. GREBE   3,149,295
WAVEGUIDE JOINING BY CRISS-CROSS
WELDING OF EXTENDED FLANGES
Filed May 28, 1962

INVENTOR.
John J. Grebe
BY
ATTORNEY

United States Patent Office 3,149,295
Patented Sept. 15, 1964

3,149,295
WAVEGUIDE JOINING BY CRISS-CROSS WELDING OF EXTENDED FLANGES
John J. Grebe, Midland, Mich., assignor to The Dow Chemical Company, Midland, Mich., a corporation of Delaware
Filed May 28, 1962, Ser. No. 198,072
2 Claims. (Cl. 333—98)

This invention relates to novel waveguide joints and a method of producing them.

Waveguides, in order to perform with maximum efficiency, must have internal surfaces which are free from physical imperfections or blemishes. For this reason, waveguides are often internally coated with silver, copper, or the like, said coating usually having a mirror finish. Internal dimensions of waveguides are of the utmost criticality. Slight discrepancies in dimension may cause great distortion in the carried wave.

As a matter of practical construction, waveguides are generally built with a square or rectangular cross-section. Waveguides of circular cross-section are equally good for transmission purposes, but are more easily distorted by handling necessary during installation.

Waveguide systems may be as long as needed, thousands of miles, if desired. Intermediate stations may strengthen signals to be transmitted over longer waveguide systems.

Since it would be impractical to build, carry, and install a unitary waveguide system of great length, waveguides are generally manufactured in segments of convenient length, said segments being joined during installation of the waveguide system.

Entry of moisture or moisture laden air, or debris of any kind into the waveguide is not desirable. Moisture may cause corrosion or other surface distorting phenomena which would render operation of the waveguide less efficient. This problem becomes particularly extreme when it is desirable that the completed waveguide be buried underground or submerged under water. Thus, joints made in coupling waveguide segments to form a waveguide must be air and water tight, and be strong enough to withstand handling. Further, the joints must be strong enough to withstand environmental stresses and pressures exerted on the installed waveguide. The interior surface of these joints must be sufficiently smooth that no change in the interior surface of the waveguide is apparent.

Once waveguide segments have been joined, it may be desirable that each joint be checked to insure that an air and water tight seal has been accomplished.

It is an object of the present invention to provide waveguide joints which are air and water tight and have inner surfaces which are maintained smooth and in close alignment, and the assembly is sufficiently strong to withstand handling and environmental stresses and pressures.

It is another object of the present invention to provide a novel method of producing waveguide joints having the characteristics described above.

Other objects and advantages of the present invention will become apparent in the course of the following specification taken in conjunction with the accompanying drawing in which.

Figure 1:
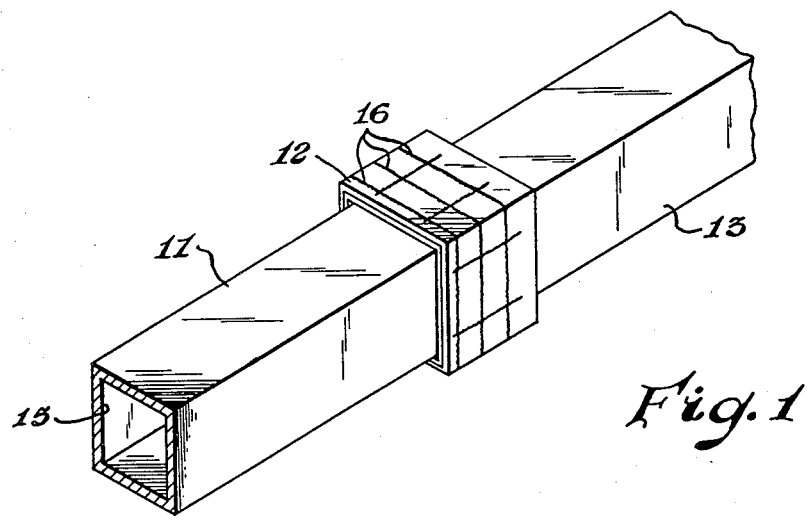
FIGURE 1 is a partial isometric view of a waveguide showing a completed joint embodying this invention.
Figure 2:
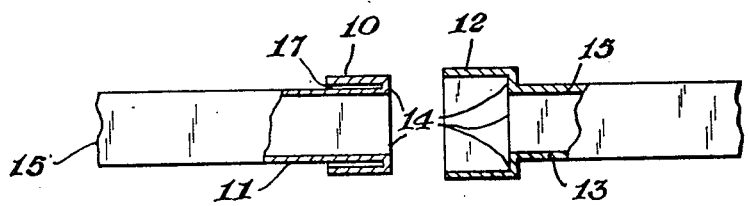
FIGURE 2 is a partial side elevation of a pair of waveguide segments partially in section prior to joining.
Figure 3:
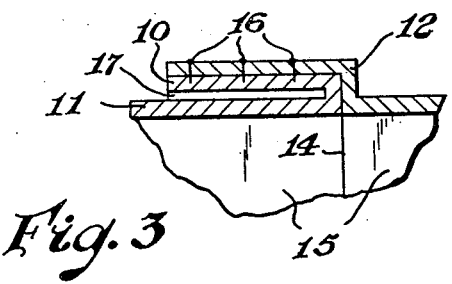
FIGURE 3 is an enlarged side elevation in section of the waveguide joint of the present invention.

The objects of the present invention may be accomplished by rolling or folding one end 10 of a waveguide segment 11 back on itself so that the rolled or folded end portion 10 lies parallel to and a slight distance from the outer side of the main body of the waveguide segment 11. One end 12 of a second waveguide segment 13 is expanded to closely fit over the rolled portion 10 of the first waveguide segment 11. If desired, final internal dimensional finishing and surface preparation may be accomplished after the end of the waveguide segments have been prepared by forming as above.

When the waveguide segments have been prepared, joining is accomplished by fitting the first or male waveguide segment end 10 into the second or female waveguide segment end 12. If desired, the male 10 and female 12 segments may be fastened together, as by cementing, silver soldering, or the like, at their area of mutual circumferential contact 14 closest the inner surfaces of the waveguide segments. Care must be taken when performing such an operation in order that no debris falls into the hollow waveguide and that no projections are left which would mar the inner surface 15 of the hollow waveguide.

After the waveguide segments have been fitted together and, optionally, cemented or soldered, the overlapping portions are welded together by at least one circumferential weld 16. This weld should be continuous and air and water tight. It is imperative to the objects of this invention that there be no weld on the main body 11 of the waveguide. To facilitate this requirement, a small space 17 is maintained between the rolled portion 10 of the male waveguide segment and the main body 11 of waveguide segment. This space 17, may be filled, if desired, with a composition which will prevent air, moisture, and the like, from causing corrosion of the waveguide under overlap joint. Filling of the space 17 is usually accomplished after welding. Appropriate filler materials are water insoluble organic materials such as: polystyrene, polyethylene, and the like.

Welding may be accomplished by any of several well known methods, for example, resistance welding, pressure welding, or electron gun welding. Electron gun welding lends itself particularly well to the requirements of the present invention. Accurate control of weld penetration in the electron gun method insures that no weld is made on the main waveguide body which could cause distortion. Penetration of the weld is made through the female portion 12 and only part way through the male portion 10 of the joint.

Forming necessary for the joining of waveguide segments according to this invention may be done alternately as by providing each segment with a male and a female end, or each segment may be provided with both male or both female ends. In the second case it would be necessary, of course, to alternate male end and female end formed segments.

To insure air and water tightness, more than one circumferential weld may be employed. Thus, if one or more imperfections exist in a given weld, another weld will act as a barrier to air, water or other matter. As further insurance against leaks, the joint may be compartmentalized by cross-welding as illustrated in FIGURE 1.

The method of this invention has a further advantage in that if the joint is compartmentalized, one or more compartments may be filled with a high diffusion gas such as hydrogen, helium, neon, argon, or the like. Leaks of such gas, indicating an imperfect weld, may be easily detected before the waveguide is permanently installed, the situation remedied forthwith.

Under ordinary circumstances it is usually highly impractical to attempt to position a gas in a compartment of the type contemplated in this invention. In the usual situation, then, it is generally best to position within each compartment, an amount of a compound which will evolve the desired gas after sealing of the compartment has been accomplished.

Gas evolution may be accomplished in several ways depending on the compound used and the gas desired. If hydrogen is the preferred gas, then sodium hydride may be positioned within a compartment and sealed therein. Upon heating the sodium hydride, hydrogen gas is evolved. If tritium is substituted for the hydrogen in sodium hydride, radiation detection means may additionally be employed in the detection of leaks since tritium is weakly radioactive. A method of producing inert gas from a compound within a compartment is by bombarding the compound with high speed neutrons or other particles to form gas by transmutation. Sodium chloride, within a compartment, upon being thus bombarded, will generally evolve argon from the original chlorine.

Various modifications may be made in the present invention without departing from the spirit or scope thereof, and it is to be understood that I limit myself only as defined in the appended claims.

I claim:

1. A waveguide joint comprising, in combination two waveguide segments having a continuous inner surface, one end of one such waveguide segment having a circumferential flange unitary with, and approximately parallel to the longitudinal axis of said waveguide segment, one end of the second such waveguide segment being expanded so as to closely fit around the circumferential flange of the first waveguide segment, and at least two continuous, circumferential welds joining said first and second waveguide segments only in the area of contact of the circumferential flange of the first waveguide segment with the expanded portion of the second waveguide segment and having a plurality of cross-welds between said circumferential welds, thereby forming at least one separate compartment.

2. A waveguide joint comprising, in combination two waveguide segments having a continuous inner surface, one end of one such waveguide segment having a circumferential flange unitary with, and approximately parallel to the longitudinal axis of said waveguide segment, one end of the second such waveguide segment being expanded so as to closely fit around the circumferential flange of the first waveguide segment, and at least two continuous, circumferential welds joining said first and second waveguide segments only in the area of contact of the circumferential flange of the first waveguide segment with the expanded portion of the second waveguide segment having a plurality of cross-welds between said circumferential welds, thereby forming at least one separate compartment, said compartment containing a compound which will evolve a high diffusion gas.

References Cited in the file of this patent

UNITED STATES PATENTS

| | | |
|---|---|---|
| 1,938,035 | Mann | Dec. 8, 1933 |
| 2,127,073 | Topping | Aug. 16, 1938 |
| 2,273,154 | Stromsoe | Feb. 17, 1942 |
| 2,857,177 | Loetz | Oct. 21, 1958 |